Aug. 31, 1954   B. COOPER ET AL   2,687,936
MASTER CLOCK TIME CONTROL SYSTEM
Filed April 23, 1951   3 Sheets-Sheet 1
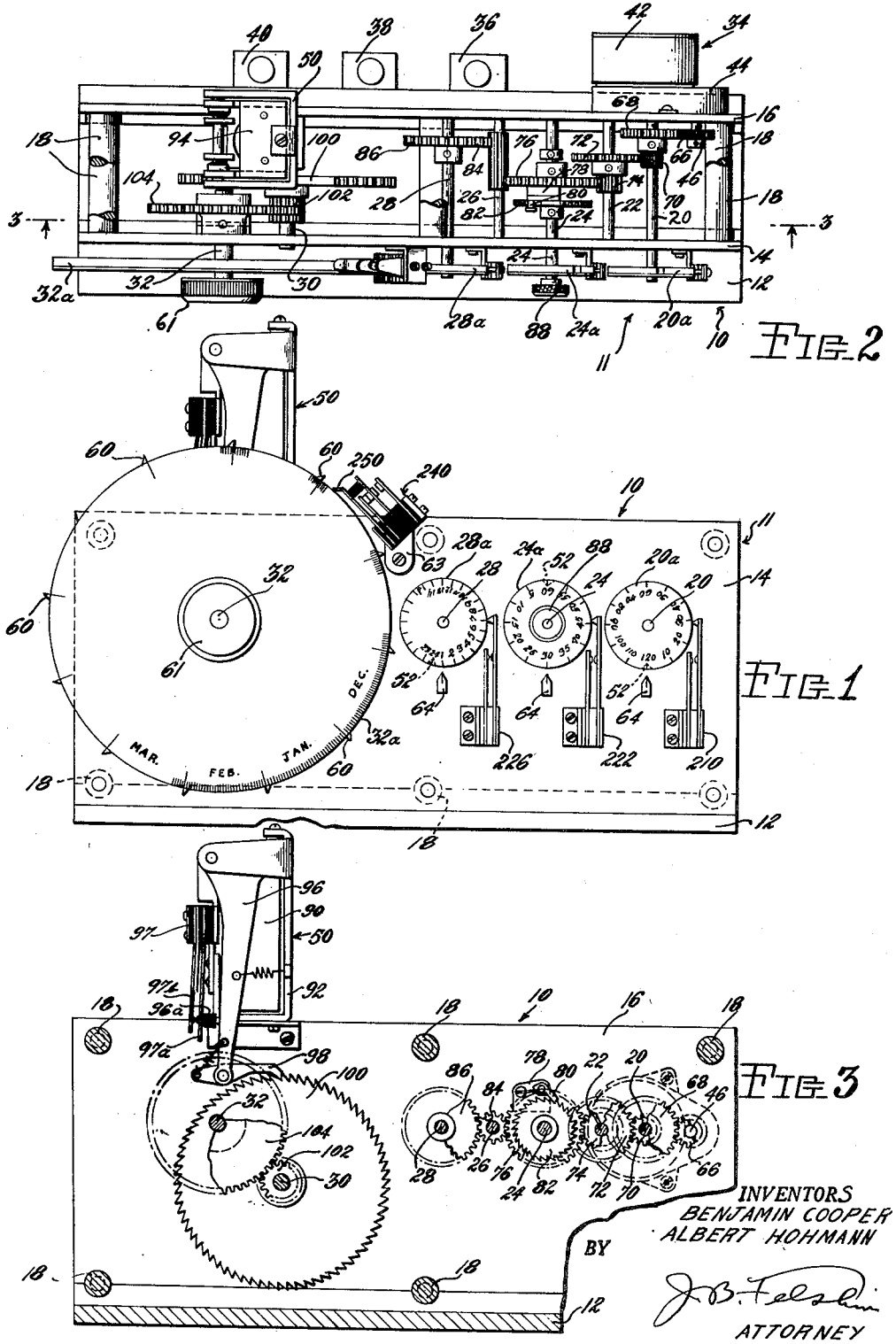
INVENTORS
BENJAMIN COOPER
ALBERT HOHMANN
BY
ATTORNEY

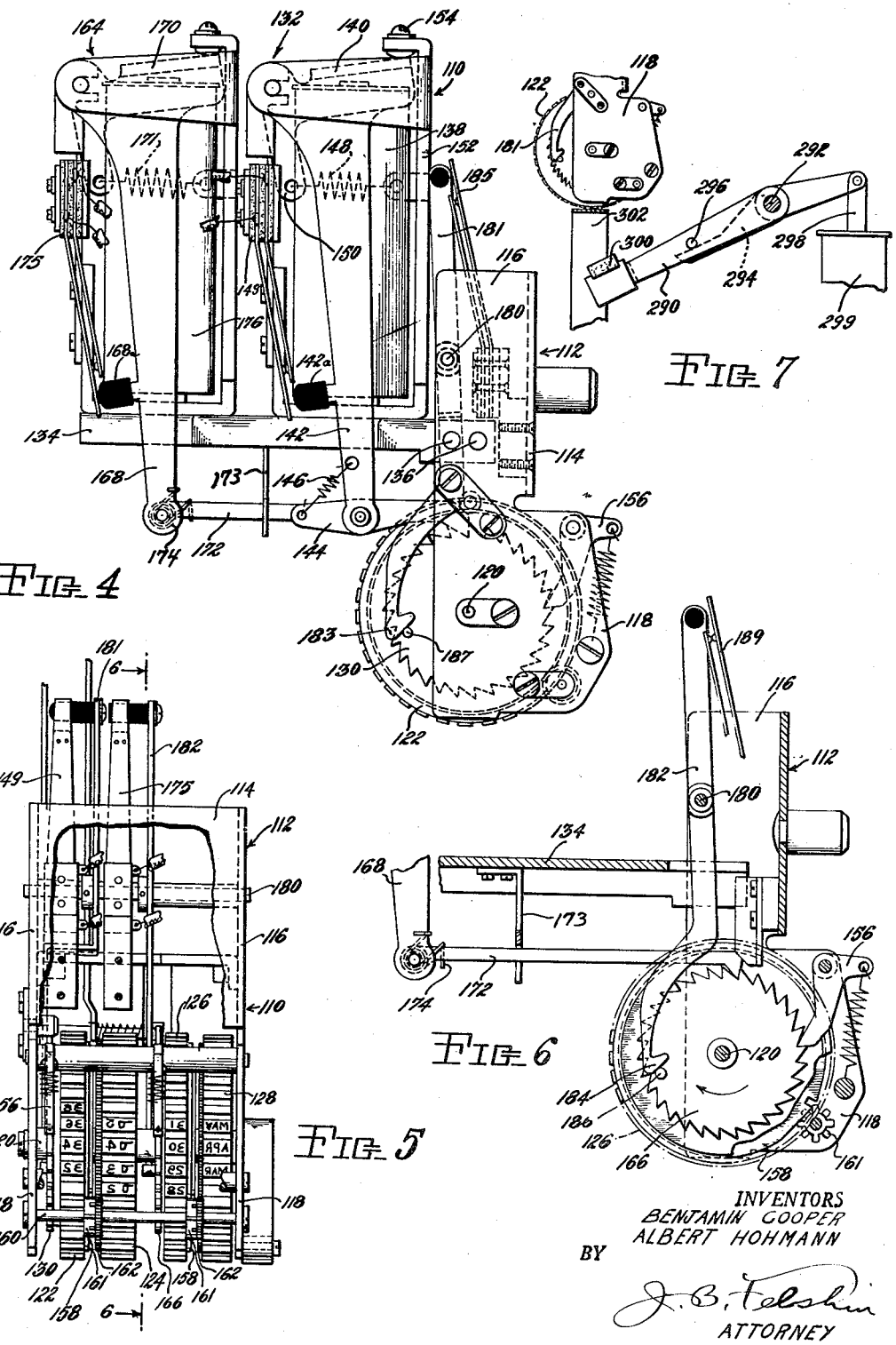

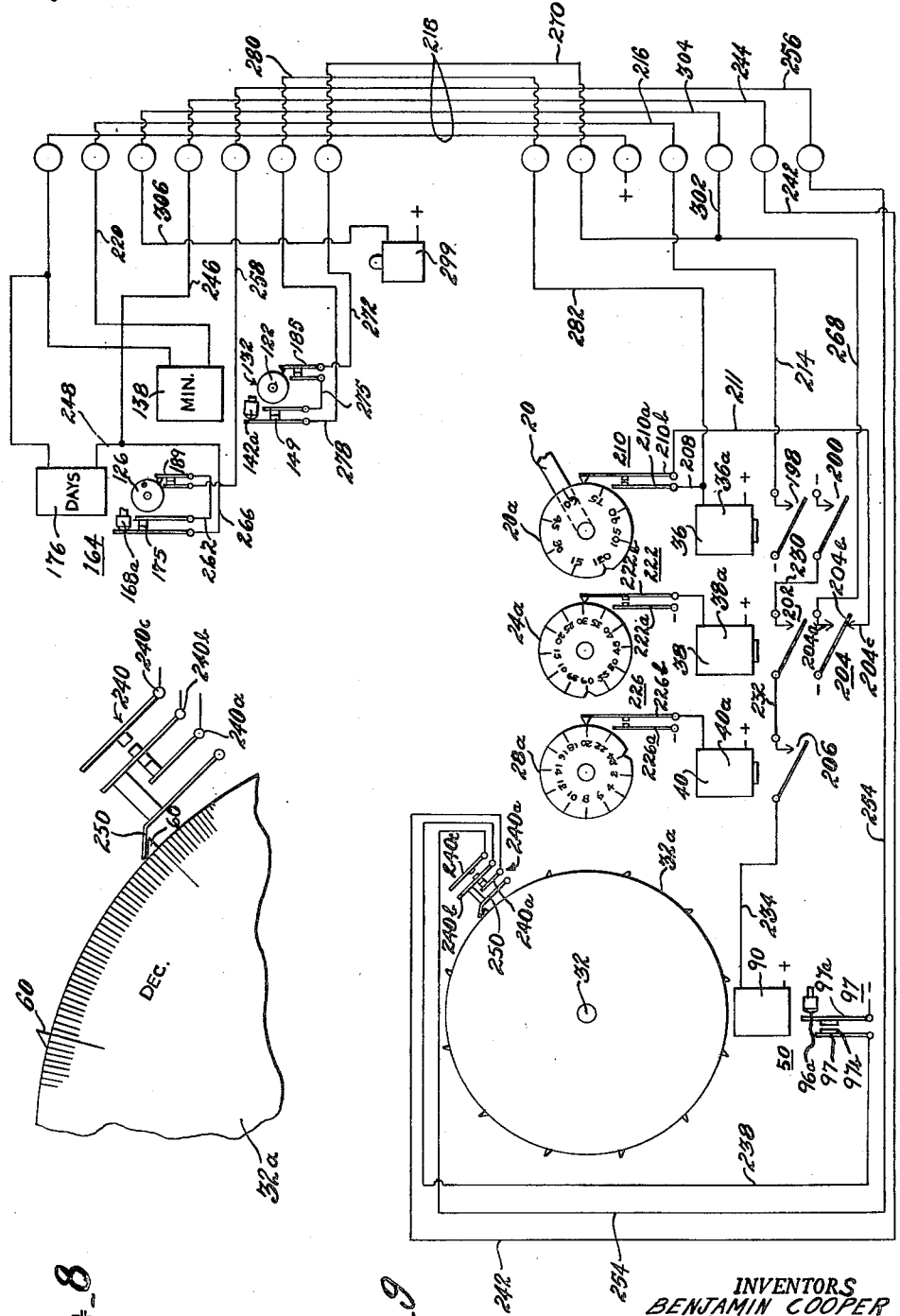

Patented Aug. 31, 1954

2,687,936

UNITED STATES PATENT OFFICE 2,687,936

MASTER CLOCK TIME CONTROL SYSTEM

Benjamin Cooper, New York, N. Y., and Albert Hohmann, Teaneck, N. J.; said Hohmann assignor to said Cooper Application April 23, 1951, Serial No. 222,386

11 Claims. (Cl. 346—87)

1

This invention relates to a master clock system for remotely controlling electrical timing devices.

The invention appertains to a master control system wherein the master clock includes minute, hour and day time controls that are synchronously operable and driven by a synchronous motor. An electro-magnetically rotatable month time control is also provided which is operable at predetermined intervals by said minute, hour and day time controls.

The master clock is adapted to synchronously control one or more remote indicators having minute, hour, day and month printing wheels. In addition to normal periodic control, said master clock provides a special control that automatically advances said remote day wheels from the last day of a month to the first day of the succeeding month for those months having less than thirty-one days. Further, there is provided a control that is operable once each hour to automatically resynchronize any minute wheels that are lagging as a result of a temporary interruption from power failure, maintenance or the like.

Such a master clock control system is exemplified in toll collection systems wherein date-time registers are provided in each of a plurality of toll booth registers. Printing mechanisms conventionally associated with each register prints an accumulation of toll register data concurrently with the date-time data. Thus, a correlation is established which facilitates analyzing of the recorded toll register data. In such systems it is readily apparent that accurate control must be maintained over each remote date-time indicator. The present invention not only maintains the desirable accurate control but is also automatic in operation to repetitiously perform such control functions for four-year periods without manual resetting.

Accordingly, one of the objects of the invention is to provide in a master clock of the character described, minute, hour and day timing means synchronously operable by a synchronous motive means, a month timing means electromagnetically operable by said day timing means, and control means associated with each of said timing means to remotely control one or more, minute, hour, day and month indicators in synchronism therewith.

Another object resides in the provision of a master clock having means to automatically advance said remote indicators from the last day of a month to the first day of the succeeding

2 month of those months having less than thirty-one days.

A further object is to provide in a master clock of the character described, means to automatically resynchronize once each hour any of said remote indicators that may have been temporarily stopped or otherwise put out of synchronization.

And another object is to provide in a master clock of the character described, dial indicating means operable by said minute, hour, day and month timing means to generally indicate the time relationship of said minute, hour, day and month timing means.

A further object is to provide in a master clock system of the character described, means to print against said remote minute, hour, day and month indicators operable once each hour and controlled by said master clock hour timing means.

Another object of the invention resides in the provision of a highly improved and compact master clock of the character described, which shall be easy to operate, positive in action, which shall have a large variety of applications, and yet be practical and efficient to a high degree in use.

Other ancillary objects will, in part, be obvious and in part hereinafter pointed out.

The invention accordingly consists in features of construction, combination of elements, and arrangement of parts which will be exemplified in construction hereinafter described, and of which the scope of application will be indicated by the appended claims.

In the drawings:

Fig. 1 is a front elevation of the invention illustrating the master clock control means.

Fig. 2 is a plan view of the embodiment shown in Fig. 1.

Fig. 3 is a cross-section taken along line 3—3 of Fig. 2.

Fig. 4 is a side elevation of a remote date-time printing indicator.

Fig. 5 is a rear elevation of the remote indicator with portions of the frame cut-away and the electro-magnets omitted.

Fig. 6 is a cross-section taken along line 6—6 of Fig. 5 illustrating the printing wheel controlled switch lever.

Fig. 7 is a fragmentary view of a printing mechanism.

Fig. 8 is an enlarged fragmentary view of the year wheel and control switch.

Fig. 9 is a schematic wiring diagram of the master time clock and a remote indicator.

Referring now in detail to Figures 1, 2 and 3 of the drawings, 10 designates a master time clock unit. The same comprises a frame 11 having a base 12 and parallel vertical side walls 14 and 16 secured thereto and upstanding therefrom. Said side walls 14 and 16 are reinforced and interconnected by plural transverse spacer rods 18.

Journalled in suitable apertures and interposed between frame side walls 14 and 16 are rotatable parallel, transverse shafts 20, 22, 24, 26, 28, 30 and 32. Shafts 20, 24, 28, and 32 extend forwardly through frame wall 14 and have secured thereon concentric dial cams 20a, 24a, 28a, and 32a, respectively, located in front of wall 14. Shafts 20, 22, 24, 26 and 28 are at the same horizontal level. Mounted on the outer surface of frame wall 16 are driving unit 34, relays 36, 38 and 40. Driving unit 34 comprises a synchronous motor 42, a gear reduction box 44 and a stub shaft 46 journalled in a suitable aperture in frame wall 16. Mounted on an angle bracket 48 secured to the inner surface of frame wall 16 is an electro-magnet unit 50.

Each of the cam dials 20a, 24a and 28a has recessed in the periphery thereof, a notch 52 and associated therewith are switches 210, 222 and 226 mounted on frame wall 14. Cam dial 32a has disposed about its periphery plural protrusions 60 and associated therewith is a switch 240 mounted on a bracket 63 secured to frame wall 14. Each of the cam dials 20a, 24a and 28a also has associated therewith, a pointer 64.

Stub shaft 46 of driving unit 34 has affixed thereto a pinion 66 disposed in engagement with gear 68 secured to shaft 20. A pinion 70 affixed to shaft 20 is disposed in engagement with a gear 72 fast on shaft 22. A pinion 74 affixed to shaft 22 engages a gear 76 freely rotatable on shaft 24. Radially extending from and secured to gear 76 is a bracket 78 upon which a pawl 80 is pivotally mounted. Disposed in coaxial relation to gear 76 is a ratchet wheel 82 that is secured to shaft 24. Pawl 80 is spring-urged into engagement with ratchet wheel 82, therefore, shaft 24 normally rotates upon the rotating of gear 76. Gear 76 further engages a pinion 84 secured to shaft 26 which, in turn, engages a gear 86 affixed to shaft 28.

Motor 42 is of the synchronous alternating current type and is arranged to repetitiously rotate shaft 20 one complete revolution every two minutes. Accordingly, shaft 20 is designated the minute shaft.

Shaft 24 is arranged to complete one revolution every sixty minutes, and accordingly is designated as the hour shaft.

Shaft 28 is arranged to rotate one complete revolution every twenty-four hours and is therefore designated the day shaft.

Thus, continuous rotation of synchronous motor 42 effects the rotation of shafts 20, 24 and 28 in synchronous increments of seconds, minutes and hours, respectively. The faces of the respective dials are provided with indicia representative of such increments.

Shaft 24 is further provided with a knob 88 secured to the outer terminal thereof to permit manual setting of cam dial 24a relative to its associated pointer 64. Clockwise rotation of ratchet wheel 82, as viewed in Figure 3, displaces pawl 80 without disturbing the position of the related gear 76. Thus, cam dial 24a may be rotated clockwise to align a selected portion of the dial face with pointer 64. Obviously, this procedure is only required upon the initial operation of the time clock unit 10 or the restarting thereof after a temporary cessation for maintenance or the like.

Shaft 32 and cam dial 32a affixed thereto are arranged to rotate through one complete revolution every three hundred and sixty-five days in daily increments under the control of electromagnet unit 50. Unit 50 comprises an electromagnet coil 90 mounted on a frame 92 and having a cooperating armature 94 actuable thereby. Armature 94 is provided with a depending arm 96 having a switch 97 actuable thereby and a pawl 98 pivotally secured thereto. Pawl 98 is spring urged into peripheral engagement with a ratchet wheel 100 affixed to shaft 30. A pinion 102 also affixed to shaft 30 is disposed in engagement with a gear 104 secured to shaft 32. Thus, energization of coil 90 effects the clockwise rotation of arm 96, as viewed in Figure 3, to a position wherein pawl 98 is disposed in engagement with the adjacent ratchet tooth. Upon the deenergization of coil 90, spring 106 interposed between arm 96 and frame 92, returns arm 96 in a counter-clockwise direction. Accordingly, ratchet wheel 100 is rotated clockwise one increment and through the related pinion and gear, shaft 32 is analogously rotated clockwise one increment. Cam dial 32a has the face thereof divided into three hundred and sixty-five increments each being representative of a twenty-four hour period. Therefore, an electrical impulse once each day and preferably timed to occur at midnight, will advance cam dial 32a one increment. The daily or twenty-four hour increments on the face of dial 32a are further grouped into consecutive units representative of the respective twelve months of the year. Plural protrusions 60 are peripherally disposed in radial alignment with those increments corresponding to the last day of each month. Protrusions 60 are provided for a purpose hereinafter appearing.

Referring to Figures 4, 5 and 6, of the drawings, there is shown a remote date-time indicator generally designated as 110. Indicator 110 comprises a frame 112 having a transverse vertical portion 114 and parallel side walls 116 perpendicularly extending therefrom. Side walls 116 are formed to provide a pair of oppositely disposed shoulders 118 in which printing wheel shaft 120 is mounted. Rotatably journalled on shaft 120 are printing wheels 122, 124, 126 and 128. Wheel 122 has embossed on the periphery thereof, indicia representative of sixty minutes disposed equidistantly in consecutive two-minute increments. Adjacent to printing wheel 122 is printing wheel 124 having indicia representing twenty-four hours circumferentially disposed thereon in consecutive hourly increments. Secured to printing wheel 122 is a concentric ratchet wheel 130 which is adapted for rotation by means of an electro-magnet 132. Electromagnet 132 is mounted on a horizontally extending bar 134 secured to frame 112, as by rivets 136, and comprises a coil 138 and a pivotally mounted armature 140 having a depending arm 142. Arm 142 has pivotally mounted on the lower terminal thereof, a pawl 144 that is urged by spring 146 into peripheral engagement with ratchet wheel 130. Coil 138, when energized, attracts armature 140 thereto, thus rotating arm 142 clockwise, as viewed in Figure 4. Coil spring 148 interposed between a second depending arm 150 fixed to armature 140 and electro-magnet frame 152, is tensioned and accordingly, upon the deenergization of said coil, spring 148 returns armature 140 counter-clockwise. A normally closed-switch 149 is arranged to be open-circuited by a protrusion 142a on arm 142 with each actuation thereof. An adjustable screw 154 limits the counter-clockwise movement of armature 140. The clockwise movement of arm 142 moves pawl 144 from engagement with one tooth into engagement with the adjacent tooth. Thus, de-energization of coil 138 permits counter-clockwise movement of arm 142 and pawl 144 by spring 148 to rotate ratchet wheel 130 clockwise one increment. A pawl 156 also spring-urged into engagement with ratchet wheel 130 prevents retrograde movement thereof.

Secured on the opposite face of printing wheel 122 is a disc 158 having one notch therein. Disposed on transverse shaft 160, is a transfer gear 161 arranged to cooperate with disc 158 and a gear 162 fixed to the face of printing wheel 124. Thus, for each complete revolution of minute wheel 122, hour wheel 124 is rotated one increment or advanced one hour.

Printing wheels 126 and 128 operate in an analogous manner under the control of an electro-magnet 164. The periphery of wheel 126 is equidistantly divided into thirty-one increments representing the thirty-one consecutive days of a month. Secured to the face of wheel 126 and coaxial therewith, is a ratchet wheel 166. Depending arm 168 of armature 170 of electro-magnet 164, carries a pawl 172 arranged to peripherally engage ratchet wheel 166. Torsional spring 174 urges said pawl into engagement with said wheel guided by a bracket 173 secured to bar 134. A normally closed-switch 175 is arranged to be open-circuited by protrusion 168a of arm 168 with each actuation thereof, thus, energization of coil 176, of electro-magnet 164, will through armature 170, arm 168 and pawl 172, rotate ratchet wheel 166 clockwise, as viewed in Figures 4 and 6.

Printing wheel 128 is circumferentially divided into twelve increments each being provided with indicium representative of a respective month. A transfer mechanism, comprising a disc 158 affixed to the opposite face of wheel 126, a transfer pinion 161 and a gear 162 secured to the printing wheel 128, couples wheel 128 with wheel 126. Therefore, one complete rotation of wheel 126 will, through said transfer mechanism, rotate wheel 128 one increment. A second pawl 156 is arranged to prevent retrograde movement of ratchet wheel 166.

Journalled on a transverse shaft 180 interposed between sidewalls 116, are pivotal levers 181 and 182 formed with terminal hook portions 183 and 184, respectively. Hook portion 184 of lever 182 is normally disposed adjacent to the face of ratchet wheel 166 and is displaceable by means of a pin 186 affixed to ratchet wheel 166. Pin 186 is disposed in radial alignment with the indicium representative of the last or thirty-first day of the month and is provided for a purpose hereinafter appearing. Hook portion 183 of lever 181 is normally disposed adjacent to the face of ratchet wheel 130 and is displaceable by means of a pin 187 affixed to ratchet wheel 130. Pin 187 disposed in radial alignment with the indicium representative of zero minutes and is provided for a purpose hereinafter appearing. Actuable by levers 181 and 182 are normally closed switches 185 and 189, respectively.

Circuit means are provided to control remote indicator units 110 and to this end there are provided relays 36, 38 and 40 Figure 9. Relay 36 has associated therewith normally open switches, 198 and 200 adapted to close-circuit upon the energization of relay coil 36a.

Relay 38 has associated therewith a normally open switch 202 adapted to close-circuit upon the energization or relay coil 38a. Switch 204 has fixed contacts 204a and 204b and a swinging contact 204c. Contacts 204b and 204c are normally close-circuited and are adapted to open circuit when relay coil 38a is energized. Contacts 204a, and 204b, normally open-circuited, are adapted to close-circuit with the energization of relay coil 38a.

Relay 40 has associated therewith a normally open pair of contacts 206 adapted to close-circuit upon the energization of relay coil 40a.

Relay coil 36a has one end of the winding thereof connected to the plus terminal of a conventional power supply, not shown. The other end of said coil winding is connected, as by conductor 208 to spring contact 210a of switch 210 associated with dial 20a. Contact 210b of switch 210 is connected, as by conductor 211, to fixed terminal 204c, through normally closed contact 204b to the minus terminal of the power supply, not shown. Spring contact 210b is arranged to engage the periphery of dial 20a and is held out of contacting engagement with contact 210a thereby. Switch contacts 210a and 210b will close-circuit upon spring contact 210b entering notch 52 in the periphery of dial 20a. Therefore, with each two-minute revolution of dial 20a switch 210 will be momentarily actuated to energize relay 36. The energizing of relay 36 closes switches 198 and 200. Switch 198 completes a circuit from the negative potential source through closed-circuit contacts 198a and 198b, conductor 214, conductor 216 of cable 218 and conductor 220 to one terminal of electro-magnet 132. The other terminal of electro-magnet 132 is connected to a source of positive potential. Accordingly, electro-magnet 132 is energized and pawl 144 is moved into engagement with the adjacent tooth on ratchet wheel 130. Continued rotation of dial 20a opens switch 210, thus deenergizing relay 36 and opening relay switches 198 and 200. Electro-magnet 132 is deenergized and spring 148 thereon urges pawl 144 to advance ratchet wheel 130 and minute printing wheel 122, one increment.

It is readily apparent that continuous rotation of dial 20a will pulse electro-magnet 132 every two minutes and concurrently advance minute printing wheel 122 one increment therewith. After thirty such pulses, or a period of one hour, hour-printing wheel 124 will be advanced, through the transfer mechanism, one increment.

The hour master timing device, i. e., dial 24a has associated therewith a normally open switch 222 adapted to close-circuit momentarily during each hourly rotation of said dial. Notch 52 peripherally disposed in dial 24a is arranged to receive contact 222b of switch 222 therein and permit closure of contacts 222a and 222b for the period of entry.

Closure of switch 222 completes a circuit from negative potential source, through closed-circuit contacts 222a, 222b, coil 38a of relay 38 to the positive source of potential. Therefore, relay 38 is energized and switch 202 is closed. Switch contact 204b moves from engagement with contact 204c into engagement with contact 204a and a circuit is established which energizes remote printing solenoid 299, hereinafter described.

Switch 204 further performs in a circuit employed for the purpose of automatically correcting each hour, minute-printing wheel 122 located in remote indicator 110 and will be hereinafter described in detail.

Associated with the twenty-four hour or day-dial 28a is a normally open switch 226 adapted to close-circuit once during each twenty-four hour revolution of said dial. Dial 28a is likewise provided with a peripheral notch 52 in which contact 226b is adapted to enter and engage contact 226a. Closure of switch 226 energizes relay 40 through a circuit from negative supply, closed-circuit contacts 226a, 226b and relay coil 40a to the positive source of supply. Energization of relay 40 effects the closure of normally open switch 206.

Notches 52 are disposed in circumferential alignment in dials 34a, 46a and 58a, respectively, whereby once each hour, switches 218 and 222 are concurrently closed and once each twenty-four hour period, switches 218, 222 and 226 are concurrently closed. Therefore, relays 36, 38 and 40 are concurrently energized and switches 200, 202 and 206 are concurrently closed.

A circuit is thus established from negative source of potential through closed switch 200, conductor 230, closed switch 202, conductor 232, closed switch 206, conductor 234, the coil 90 of electro-magnet 50 to the positive source of potential. Accordingly, electro-magnet 50 is energized and pawl 98 thereon is moved into an adjacent tooth on ratchet wheel 100. As soon as switch 210 opens, the circuit is opened and electro-magnet 50 deenergizes. Spring-urged pawl 98 advances ratchet wheel 100 one tooth and causes pinion 102, gear 104 and gear shaft 32 to rotate in accordance therewith. Dial 32a fixed to shaft 32, rotates one increment.

Thus, it is evident that dial 32a will be advanced one increment every twenty-four hours. Concurrently, with the advancement of dial 32a, a circuit is established to the remote indicators which energizes electro-magnet 164 and therefore, effects the advancement of day printing wheel 126 one increment. Said circuit is established by means of normally open switch 97 disposed on electro-magnet 50. Contact 97a of switch 97 is adapted to be engaged by armature arm 96 and moved into engagement with contact 97b when electro-magnet 50 is energized. A circuit then exists from the negative potential source, through closed switch 97, conductor 238, normally closed contacts 240a, 240b of switch 240 mounted adjacent to dial 32a, conductor 242, conductor 244 of cable 218, to a remote indicator, conductors 246, 248 therein, to coil 176 of electro-magnet 164, and through said coil to a positive source of potential. Therefore, electro-magnet 164 energizes and pawl 172 moves into the adjacent tooth on ratchet wheel 166.

Deenergization of electro-magnet 50, accordingly opens switch 97 and electro-magnet 164 deenergizes. Day-printing wheel 126 is then advanced one increment by spring 171 on electro-magnet 164.

Day-printing wheel 126 has equidistantly disposed on the periphery thereof in consecutive order, the numbers one through thirty-one. Therefore, thirty-one pulses are required to rotate day-printing wheel 126 through one complete revolution. The transfer mechanism advances month-printing wheel 128 one increment for each complete revolution of day-printing wheel 126. For example, at midnight on thirty-first day of December, day-printing wheel 126 will be advanced from a 31 printing position to a 1 printing position. Concurrently therewith, month-printing wheel 128 will advance from December printing position to January printing position.

Means are provided to automatically advance day-printing wheel 126 from the last day of a month having less than thirty-one days, to the first day of the succeeding month. It is readily apparent that the normal daily advance of printing wheel 126 cannot compensate for the indicia present on said wheel that is not applicable to the relatively short months. As an example, February is normally twenty-eight days, therefore, the indicia on said wheel representative of the 29th, 30th and 31st day is not required and said wheel must necessarily be advanced thereover. Further, the advancement of the excess indicia must be rapid to occur within the period of normal daily advancement. To this end there is provided on the periphery of year-dial 32a, plural protrusions 60 each being disposed in radial alignment with the indicia corresponding to the last day of the respective months. A spring lever 250 is pivotally supported at one end thereof by switch 240 and adapted at the other end thereof to peripherally engage dial 32a. Lever 250 is further adapted to actuate switch contact 240b of switch 240, to move contact 240b out of engagement with contact 240a and into engagement with contact 240c upon being displaced by a protrusion 60. Protrusions 60 being disposed relative to the last day of each month, will on said day actuate lever 250 to prepare a special circuit. This special circuit is completed upon the closure of switch 97 by the energizing of electro-magnet 50, which, as hereinbefore described, occurs at midnight of each day. Thus, a circuit is established from the negative source of potential, through closed switch 97, conductor 238, closed contacts 240b, 240c, conductor 254, cable conductor 256, conductor 258, normally closed switch 189, conductor 262, normally closed switch 175, conductors 266, 248 to coil 176 of electro-magnet 164. Coil 176 is further connected to the positive potential source. Thus, electro-magnet 164 is energized and pawl 172 thereon is moved into engagement with the adjacent tooth on ratchet wheel 166. After pawl 172 has moved a distance sufficient to engage the said adjacent tooth, protrusion 168a on pawl actuating arm 168 engages one contact of switch 175 and opens said switch and related circuit. Accordingly, the spring returned pawl 172 rotates day-printing wheel 126 one increment. However, with the return of pawl actuating arm 168, switch 175 once again closes and recompletes the aforesaid circuit to reenergize electro-magnet 164. The oscillating pawl 172 thus repetitiously advances day-printing wheel 126 until said wheel is disposed in the position corresponding to the first day of the next month.

Means are provided to interrupt said circuit upon said wheel being disposed on the first day of the next month. The protrusion 186 disposed on the face of wheel 166 in radial alignment with the indicia corresponding to the first day, engages hook portion 184 of lever 182 and pivots said lever clockwise, as viewed in Figure 6. Accordingly, lever 182 engages one contact of switch 189 and opens said switch. The opening of switch 189 opens the oscillating circuit, thus preventing further oscillating of pawl 172. The rapid pulsing of electro-magnet 164 occurs while electro-magnet 50 is energized. Therefore, deenergization of electro-magnet 50 opens switch 97 and advances year-dial 32a one increment. Protrusion 60 is moved from engagement with lever 250 and contact 240b of switch 240 moves out of engagement with contact 240c and returns to engage contact 240a. The daily advancement of year-dial 32a and remote day-printing wheel 126 may then continue in the normal manner hereinbefore described for successive days.

Manually rotatable knob 61 facilitates the resetting of dial 32a during leap-years wherein February has twenty-nine days. Pawl 98 is displaced manually and dial 32a is rotated clockwise one increment. This operation is preferably performed on the twenty-seventh day of February, therefore, remote indicators 110 will be advanced the extra day in the normal manner and protrusion 60 will not be effective until midnight of the twenty-ninth day to rapidly advance the remote indicators 110.

An analogous oscillating circuit is provided for rapid advancement of minute-printing wheel 122 for hourly correction of said wheel.

As hereinbefore set forth, the hourly energization of relay 38 moves contact 204b of switch 204 out of engagement with contact 204c and into engagement with contact 204a. Closed contacts 204a, 204b complete a circuit from the negative source of potential through contacts 204a, 204b, conductor 268, cable conductor 270, to the remote indicator, conductor 272, through normally closed switch 185, conductor 275, normally closed switch 149, conductor 278, cable conductor 280, conductor 282 to one terminal of relay coil 36a. The other terminal of relay coil 36a is connected to the positive potential source, therefore, relay 36 energizes. Normally open switch 198 is closed thereby and by means of the hereinbefore described circuit, electro-magnet 132 energizes. Protrusion 142a on armature arm 142 of electro-magnet 132, after said arm has carried pawl 144 into engagement with an adjacent tooth on ratchet wheel 130, engages one contact of switch 149 thus opening said switch. The opening of said switch interrupts the energizing circuit for relay 36, therefore, switch 198 also opens and de-energizes electro-magnet 132. Minute-printing wheel 122 is advanced and switch 149 is again closed. The closing of switch 149 repeats the aforementioned cycle of repetitious operation and printing wheel 122 rapidly advances until protrusion 187 thereon engages hook portion 183 of lever 181. Lever 181 is pivotally actuated thereby, thus opening switch 185 and consequently opening said circuit. Printing wheel 122 is now disposed in zero-minute printing position.

Means is provided to print a record to the date-time settings of printing wheels 122, 124, 126 and 128. To this end there is provided a printing hammer 290 disposed for striking alignment with said printing wheels. As shown in Figure 7, hammer 290 is pivotally mounted on a central pivot point 292. A lever 294 is disposed on pivot point 292 having one end thereof abutting against a transverse rod 296 carried by hammer member 290. The other end of lever 294 is pivotally secured to plunger 298 of printing solenoid 299. Affixed to hammer member 290 is a platen 300 formed of a resilient material and adapted to engage a recording paper strip, not shown. Platen 300 is arranged to press against said paper strip which, in turn, presses against inking ribbon 302 and printing wheels 122, 124, 126, and 128, thus, printing a record of the settings of said wheels.

The hourly energization of relay 38 effects the energization of printing solenoid 299 thus causing a printing operation to occur. The circuit energizing solenoid 299 may be traced from negative source of potential, through closed contacts 204b, 204a of switch 204, conductors 268, 302, cable conductor 304, remote indicator conductor 306 to one terminal of the coil of solenoid 299. The other terminal of said coil is connected to the positive source of potential.

While a single remote indicator 110 has been shown and described, it is to be understood that plural remote indicators may be disposed in parallel circuit relation for concurrent actuation.

It will thus be seen that there is provided a timing device in which the several objects of this invention are achieved and which is well adapted to meet the conditions of practical use.

The invention claimed is:

1. In a time control system, time synchronous motive means, a first means driven thereby for rotation in minute to revolution relation, a second means driven by said motive means for rotation in hour to revolution relation, a third means driven by said motive means for rotation in day to revolution relation, an independently rotatable member, electro-magnet means to rotate said rotatable member a predetermined increment each time said electro-magnetic means is operated, and means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnet means for the minute wheel to advance said wheel, and means controlled by the operation of the electro-magnetic means which rotates the rotatable member for operating the electro-magnetic means for the day wheel for advancing the same.

2. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnetic means for the minute wheel to advance said wheel, means controlled by the operation of the electro-magnetic means which rotates the rotatable member for operating the electro-magnetic means for the day wheel for advancing the same, an hour wheel connected by transfer mechanism to the minute wheel, and a month wheel connected by transfer mechanism to the day wheel.

3. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnetic means for the minute wheel to advance said wheel, means controlled by the operation of the electro-magnetic means which rotates the rotatable member for operating the electro-magnetic means for the day wheel for advancing the same, an hour wheel connected by transfer mechanism to the minute wheel, a month wheel connected by transfer mechanism to the day wheel, said day wheel being divided in thirty-one increments, said rotary member being divided in three hundred sixty-five equiangular increments, twelve actuating means on said member dividing said member into monthly groups of increments corresponding in number to the days in the twelve months of the year, and means controlled by said actuating means to continue turning the day wheel when the day wheel has reached the last day in any month which is less than thirty-one days until the first day increment in said wheel is reached.

4. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnetic means for the minute wheel to advance said wheel, means controlled by the operation of the electro-magnetic means which rotates the rotatable member for operating the electro-magnetic means for the day wheel for advancing the same, an hour wheel connected by transfer mechanism to the minute wheel, a month wheel connected by transfer mechanism to the day wheel, said day wheel being divided in thirty-one increments, said rotary member being divided in three hundred sixty-five equiangular increments, twelve actuating means on said member dividing said member into monthly groups of increments corresponding in number to the days in the twelve months of the year, means controlled by said actuating means to continue turning the day wheel when the day wheel has reached the last day in any month which is less than thirty-one days until the first day increment in said wheel is reached, and means controlled by the second means to automatically successively actuate the electro-magnetic means for the minute wheel until the minute wheel reaches a predetermined position should the second means reach an end of hour position while the minute wheel is at an intermediate position, whereby to bring said minute wheel to end of hour position in synchronization with the second means.

5. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnet means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnet means for the minute wheel to advance said wheel, means controlled by the operation of the electro-magnetic means which rotates the rotatable member for operating the electro-magnetic means for the day wheel for advancing the same, an hour wheel connected by transfer mechanism to said minute wheel, a month wheel connected by transfer mechanism to said day wheel, means to print against said wheels, and means controlled by said second means to actuate said printing means when said second means is in said predetermined angular relationship.

6. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnetic means for the minute wheel to advance said wheel, means controlled by the operation of the electro-magnetic means which rotates the rotatable member for operating the electro-magnetic means for the day wheel for advancing the same, an hour wheel connected by transfer mechanism to the minute wheel, a month wheel connected by transfer mechanism to the day wheel, said day wheel being divided in thirty-one increments, said rotary member being divided in three hundred sixty-five equiangular increments, twelve actuating means on said member dividing said member into monthly groups of increments corresponding in number to the days in the twelve months of the year, means controlled by said actuating means to continue turning the day wheel when the day wheel has reached the last day in any month which is less than thirty-one days, and means operable by said day wheel to deactuate said turning means upon said wheel reaching a predetermined angular position.

7. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, a remote time indicator comprising a minute wheel, electro-magnetic means to advance said wheel, a day wheel, electro-magnetic means to advance the day wheel, means controlled by the first means to operate the electro-magnetic means for the minute wheel to advance said wheel, means controlled by the operation of the electro-magnetic means which rotates the rotatable member for operating the electro-magnetic means for the day wheel for advancing the same, an hour wheel connected by transfer mechanism to the minute wheel, a month wheel connected by transfer mechanism to the day wheel, said day wheel being divided in thirty-one increments, said rotary member being divided in three hundred sixty-five equiangular increments, twelve actuating means on said member dividing said member into monthly groups of increments corresponding in number to the days in the twelve months of the year, means controlled by said actuating means to continue turning the day wheel when the day wheel has reached the last day in any month which is less that thirty-one days, means operable by said day wheel to deactuate said turning means upon said wheel reaching a predetermined angular position, means controlled by said second means to automatically successively actuate the electro-magnetic means for the minute wheel should the second means reach an end of hour position while the minute wheel is at an intermediate position, and means operable by said minute wheel to deactuate said automatic actuating means upon said minute wheel reaching a zero minute position.

8. In a time control system, time synchronous motive means, a first shaft driven thereby for rotation in minute to revolution relation, a second shaft driven by said motive means for rotation in hour to revolution relation, a third shaft driven by said motive means for rotation in day to revolution relation, a dial associated with each shaft, a rotatable member, a dial associated therewith, electro-magnetic means to rotate said rotatable member a predetermined increment each time said electro-magnetic means is operated, means jointly controlled by said first, second and third shafts for operating said electro-magnetic means during a predetermined angular relationship of said first, second and third shafts, a remote time indicator comprising a minute wheel having minute indicia peripherally disposed thereon, electro-magnetic means to advance said wheel in successive two-minute increments, an hour wheel having hour indicia peripherally disposed thereon, transfer means to rotate said hour wheel in successive hourly increments, said hour wheel arranged to rotate one increment with each revolution of said minute wheel, a day wheel having day indicia divided into thirty-one increments on the periphery thereof, electro-magnetic means to advance said day wheel in successive day increments, a month wheel having indicia corresponding to the twelve months of the year disposed on the periphery thereof, transfer means to rotate said month wheel one increment with each revolution of said day wheel, means to actuate said minute wheel electro-magnetic means to advance said minute wheel one increment with each revolution of said first shaft, means to actuate said day wheel, electro-magnetic means to advance said day wheel one increment with each revolution of said third shaft, means to print against said wheels, and means controlled by said second shaft to actuate said printing means during each hourly revolution of said shaft.

9. In a time control system, time synchronous motive means, a first shaft driven thereby for rotation in minute to revolution relation, a second shaft driven by said motive means for rotation in hour to revolution relation, a third shaft driven by said motive means for rotation in day to revolution relation, a rotatable member, electro-magnetic means to rotate said rotatable member a predetermined increment each time said electro-magnetic means is operated, means jointly controlled by said first, second and third shafts for operating said electro-magnetic means during a predetermined angular relationship of said first, second and third shafts, a remote time indicator comprising a minute wheel having minute indicia peripherally disposed thereon in successive two-minute increments, an hour wheel having hour indicia peripherally disposed thereon, transfer means connected to said minute wheel to rotate said hour wheel in successive hourly increments with each revolution of said minute wheel, means to advance said minute wheel, means actuable by said second shaft in said predetermined angular relationship to automatically synchronize said minute wheel therewith should said minute wheel be out of synchronization, and means on said minute wheel to deactuate said automatic synchronizing means when said minute wheel is in synchronization with said second shaft upon said second shaft reaching said predetermined angular relationship.

10. In a time control system, time synchronous motive means, a first shaft driven thereby for rotation in minute to revolution relation, a second shaft driven by said motive means for rotation in hour to revolution relation, a third shaft driven by said motive means for rotation in day to revolution relation, a rotatable member, electro-magnetic means to rotate said rotatable member a predetermined increment each time said electro-magnetic means is operated, means jointly controlled by said first, second and third shafts for operating said electro-magnetic means during a predetermined angular relationship of said first, second and third shafts, a remote time indicator comprising a day wheel having day indicia divided into thirty-one increments on the periphery thereof, electro-magnetic means to advance said day wheel in successive day increments, a month wheel having indicia corresponding to the twelve months of the year disposed on the periphery thereof, transfer means connected to said day wheel to rotate said month wheel one increment with each revolution of said day wheel, means to advance said day wheel one increment with each revolution of said third shaft, means actuable by said rotatable member in any one of a plurality of predetermined angular positions to automatically actuate said day wheel electro-magnetic advancing means, and means on said day wheel to deactuate said actuating means when said day wheel reaches a predetermined angular position.

11. In a time control system, time synchronous motive means, a first means driven thereby for rotation in minute to revolution relation, a second means driven by said motive means for rotation in hour to revolution relation, a third means driven by said motive means for rotation in day to revolution relation, a rotatable member, electro-magnetic means to rotate said rotatable member a predetermined increment each time said electro-magnetic means is operated, means jointly controlled by said first, second and third means for operating said electro-magnetic means during a predetermined angular relationship of said first, second and third means, plural remote time indicators each comprising a minute wheel, electro-magnetic means to advance said wheel, a day wheel, electro-magnetic means to advance the day wheel, means controlled by the first means to concurrently operate all of the electro-magnetic means for the minute wheels to advance said wheels, means controlled by the operation of the electro-magnetic means which rotates the rotatable member for concurrently operating all of the electro-magnetic means for the day wheels for advancing the same, an hour wheel connected by transfer mechanism to each minute wheel, and a month wheel connected by transfer mechanism to each day wheel.

References Cited in the file of this patent

UNITED STATES PATENTS

| Number | Name | Date |
|---|---|---|
| 420,852 | Wood | Feb. 4, 1890 |
| 1,282,992 | Vicik | Oct. 29, 1918 |
| 1,769,555 | Tarbox | July 1, 1930 |
| 2,083,363 | Bryce | June 8, 1937 |
| 2,543,983 | Ostline | Mar. 6, 1951 |